United States Patent [19]
Cook et al.

[11] Patent Number: 5,736,178
[45] Date of Patent: Apr. 7, 1998

[54] COLLOIDAL DISPERSIONS OF GLUTEN, METHOD OF MAKING AND USE THEREFOR

[75] Inventors: Richard B. Cook, Revere; Mark L. Shulman, Waltham, both of Mass.

[73] Assignee: Opta Food Ingredients, Inc., Bedford, Mass.

[21] Appl. No.: 432,988

[22] Filed: May 2, 1995

[51] Int. Cl.$^6$ ........................ A23J 3/18
[52] U.S. Cl. .................. 426/93; 426/138; 426/626; 426/640; 426/656
[58] Field of Search ............ 426/93, 656, 138, 426/626, 640

[56] References Cited

U.S. PATENT DOCUMENTS

| | | | |
|---|---|---|---|
| 2,311,485 | 2/1943 | Sturken | 106/153 |
| 2,377,237 | 5/1945 | James | 106/153 |
| 2,475,133 | 7/1949 | Furter et al. | 426/72 |
| 2,791,509 | 5/1957 | Cosler | 426/302 |
| 3,314,800 | 4/1967 | Noznick et al. | 99/127 |
| 3,323,922 | 6/1967 | Durst | 99/166 |
| 3,479,191 | 11/1969 | Cole | 426/303 |
| 3,615,715 | 10/1971 | Mullen | 106/150 |
| 3,653,925 | 4/1972 | Anker et al. | 426/302 |
| 3,840,676 | 10/1974 | Yamamoto et al. | 426/89 |
| 3,991,218 | 11/1976 | Earle et al. | 426/250 |
| 4,066,796 | 1/1978 | McKee | 426/302 |
| 4,224,219 | 9/1980 | Van Blanton et al. | 106/149 |
| 4,293,572 | 10/1981 | Silva et al. | 426/19 |
| 4,543,370 | 9/1985 | Porter et al. | 424/440 |
| 4,820,533 | 4/1989 | Seaborne et al. | 426/76 |
| 4,876,094 | 10/1989 | Benton et al. | 426/472 |
| 4,876,097 | 10/1989 | Autant et al. | 426/656 |
| 4,942,043 | 7/1990 | Sander | 426/93 |
| 5,021,248 | 6/1991 | Stark et al. | 426/531 |
| 5,182,130 | 1/1993 | Haralampu et al. | 427/3 |
| 5,324,351 | 6/1994 | Oshlack et al. | 106/153 |

FOREIGN PATENT DOCUMENTS

| | | |
|---|---|---|
| 831943 | 1/1970 | Canada . |
| 0 585 688 A3 | 3/1994 | European Pat. Off. . |
| 0 593 123 A1 | 4/1994 | European Pat. Off. . |
| WO80/00659 | 4/1980 | WIPO . |
| WO89/00589 | 6/1989 | WIPO . |
| WO90/03123 | 4/1990 | WIPO . |
| WO91/06227 | 5/1991 | WIPO . |
| WO93/12667 | 7/1993 | WIPO . |

OTHER PUBLICATIONS

International Search Report, PCT/US90/06441.

Gontard et al., "Edible Wheat Gluten Films: Influence of the Main Process Variables . . . ", *Journal of Food Science* 57 (1):190–199 (1992).

Gontard et al., "Edible Composite Films of Wheat Gluten and Lipids: Water Vapour permeability . . . ", *Int.1 Journal of Food Science and Tech.* 29:39–50 (1994).

S. Okamoto, "Factors Affecting Protein Film Formation", *Cereal Science Today* 23 (5):256–262 (May 1978).

Gontard et al., "Edible Films and Coatings From Natural Biopolymers", Universite de Montpellier II, GBSA.

Shogren et al., "Functional (Breadmaking) and Biochemical Properties of Wheat Flour . . . ", *Cereal Chemistry* 46(2):93–102 (Mar. 1969).

N. Gontard, "Edible and Biogradable Films: Study of Wheat Gluten Film–Forming Properties", C.R. Acad. Agric. Fr. 80(4):109–117 (May 25, 1994).

Gontard et al., "Water and Glycerol As Plasticizers Affect Mechanical and Water Vapor . . . ", *Journal of Food Sciences* 58(1):206–211 (1993).

L. Krull & G.E. Inglett, "Industrial Uses of Gluten", *Cereal Science* 16(8):232–236, 261 (Aug. 1971).

A. Gennadios and C.L. Weller, "Edible Films and Coatings from Wheat and Corn Proteins", *Food Technology* pp. 63–69 (Oct. 1990).

F. Macritchie, "Studies of the Methodology for Fractionation and Reconstitution of Wheat Flours", *Journal of Cereal Science* 3:221–230 (1985).

J.A. Bietz and J.S. Wall, "The Effect of Various Extractions on the Subunit Composition . . . ", American Association of Cereal Chemists, Inc., pp. 145–155 (1975).

Weegles et al., "Large–Scale Separation of Gliadins and Their Bread–Making Quality", *Journal of Cereal Science* 20:253–264 (1994).

Khan et al., "Disaggregation of Glutenin with Low Concentrations of Reducing . . . ", *Cereal Chemistry* 71(3):242–247 (1994).

*Primary Examiner*—Helen Pratt
*Attorney, Agent, or Firm*—Hamilton, Brook, Smith & Reynolds, P.C.

[57] ABSTRACT

Film forming colloidal dispersions containing gluten-derived gluten and their methods of manufacture are described. The colloidal dispersion can be coated onto a variety of substrates to provide resistance to moisture, lipid and gas permeation, as well as provide a glossy sheen to the substrate. Foods coated with the colloidal dispersion are also described.

13 Claims, No Drawings

COLLOIDAL DISPERSIONS OF GLUTEN, METHOD OF MAKING AND USE THEREFOR

BACKGROUND

Edible coatings are used in foods to minimize the migration of components within the food system or between the food and its surrounding environment. For example, such coatings prevent the diffusion of flavors, water, fats and/or oxygen into, out of, or within the food system. Of these, reducing moisture migration is the most important requirement in most cases. A change in either direction of moisture levels or water activity does not have to be large to be detrimental to the food's quality. Moisture loss or uptake in a food can have dramatic effects on the texture, stability or yield of the food product. Moisture uptake can reduce or eliminate crispness, can speed enzymatic or chemical deterioration of flavors or nutrients, and can impair the food's structural integrity.

Edible barriers can also reduce gas permeability in foods. Oxygen uptake by a food often results in deleterious reactions which affect its flavor, nutritional quality and acceptability. In complex food systems, the migration of water or lipids within the food itself may have a detrimental effect on the perceived quality. Also, in processing operations, such as deep fat frying, coatings may reduce the migration of a processing aid, i.e., fat, into the food. In addition, barriers may be used to minimize the migration or loss of other additives, such as colors, flavors, preservatives, antioxidants, etc. Edible coatings also can be used to impart structural integrity to the surface of a food, making it less susceptible to mechanical damage.

Many efforts have been made to optimize water resistance, water vapor permeability and mechanical properties of edible coatings while increasing their clarity and gloss. Edible coatings from prolamines have been used to produce films, however, due to their solubility in aqueous alcohol mixtures, or in aqueous mixtures of extreme pH (less than pH 2 or greater than pH 10), most of the applications of prolamine films are from solutions of prolamines in alcohol and other solvent mixtures or water-based solutions having extreme pH's. Heat must be applied to evaporate the ethanol or else there is a substantial loss of gloss and white artifacts appear on the film. Due to these disadvantages of prolamine coating systems in foods, there has been a reluctance by the food industry to use prolamine film systems, since these solvents and/or pH levels are often incompatible with and difficult to remove from the food. Also, the use of organic solvents poses safety issues with the emission of vapors during the curing of the films, with the fire hazard that they pose, and with the possible residuals they may leave in the food.

In food applications, several protein films such as gelatin, casein and zein, have been shown to have good water and/or lipid barrier properties. For example, zein provides a glossy surface possessing both good lipid and moisture barrier protection. The use of zein has been limited to the nut and confection industry, however, due to the need for organic solvents and/or extreme pH's. Gluten has also been used for coatings but requires the presence of plasticizers and lipids to yield a coating with useful mechanical and water-barrier properties. These gluten-based films however still have inferior water barrier properties and do not provide gloss.

SUMMARY OF THE INVENTION

The present invention relates to methods of forming colloidal dispersions containing microparticles of gluten-derived protein which are suspended in a dilute aqueous acid medium. The colloidal dispersions can be maintained as stable, homogeneous dispersions under ambient storage conditions without microbial contamination. The colloidal dispersions can be coformulated with various additives, such as waxes or plasticizers, to alter the barrier properties (e.g., water/lipid resistance, vapor permeability), transparency, gloss and/or mechanical properties (e.g., flexibility) of the resultant film cast from the colloidal dispersion.

Colloidal dispersions of the present invention, when cast onto a substrate, form a glossy coating which can be dried at ambient temperature. For many food applications, the use of ambient temperature for curing the film is a significant advantage and avoids problems of product degradation if elevated temperature were used and the appearance of white artifacts within the film when ethanolic zein solutions are used. Suitable substrates include but are not limited to confections, raw, cooked and dehydrated meats, dessert items, snack foods, candies (e.g., chocolates), fruit (e.g., raisins), vegetables, cereals, baked goods, seeds, nuts, beans (e.g., coffee), vitamins and tablets.

Edible coatings produced by the present method are clear films which are non-toxic since they are formed from naturally-occurring, gluten-derived proteins, such as gluten, prolamines, glutenins or glutelins, from corn, barley, wheat, rice or sorghum. The colloidal dispersions of the present invention do not contain toxic organic solvents or require extreme pH's, thus, the residues of these undesirable elements are minimized or eliminated. Films cast from the gluten-derived protein colloidal dispersions have excellent resistance to moisture, lipid and gas permeation, provide gloss and scuff resistance to the substrate, and have excellent mechanical properties.

DETAILED DESCRIPTION OF THE INVENTION

The present invention is based upon the discovery that film forming colloidal dispersions can be made from dilute aqueous acid solutions of gluten-derived protein by causing the protein to precipitate as microparticles. This is done by altering the solubility of the gluten-derived protein in a dilute aqueous acid medium. The resultant colloidal dispersion can be maintained as a stable and homogenous dispersion under ambient storage conditions without microbial contamination.

The term "colloidal dispersion" as used herein means a suspension of gluten-derived particles having a median volume diameter of about 10 microns or less in dilute aqueous acid medium. The term "acid aqueous medium" refers to water or a water-based solution which contains dilute acid and which can optionally contain alcohol (e.g., ethanol) provided that the alcohol is at a concentration or titer at which the gluten-derived protein is insoluble therein. Dilute acid means at least 0.1% by weight acid and preferably from about 1 to about 2% by weight when about to about 20% by weight of gluten-derived protein solids are present. The alcohol percentage will vary depending upon the solubility of the protein selected. The terms "stable" and "homogeneous" as used herein define colloidal dispersions in which the microparticles of gluten-derived protein can remain uniformly dispersed within the aqueous medium for an indefinite period of time under storage conditions, without irreversible precipitation or agglomeration.

Gluten-derived proteins useful in the methods of this invention, are found in high concentrations in various grains, such as corn, wheat, barley, rice and sorghum, and in other plants and animal sources. Examples of prolamines include, for example, zein, hordein, gliadin and kafirin. Preferred gluten-derived proteins are prolamines, glutenins or glutelins which are characterized by their insolubility in water and solubility in aqueous alcohol (e.g., aqueous solutions of alcohol containing at least 40% alcohol), and by the presence in the protein of large amounts of hydrophobic amino acids, such as leucine, proline, glutamine and asparagine. The unusual solubility characteristics of prolamines is based on the fact that they are usually deficient in polar amino acids.

A preferred prolamine used in the present method is the alcohol-soluble protein-fraction of corn (Zea mays), named zein. The potential yield of zein is about one pound per bushel of corn. Zein can be readily obtained from corn gluten, which is a by-product of the corn wet milling industry. Both commercially available grades, with associated impurities, and purified forms of zein can be used. See U.S. Pat. No. 5,254,673 and U.S. Ser. No. 08/402,320, filed Mar. 10, 1995, which describe methods for purifying zein from corn gluten, the teachings of which are incorporated herein by reference in its entirety.

In one embodiment, colloidal dispersions of the present invention can be made by dissolving a gluten-derived protein in an aqueous alcohol medium, such as ethanol, to form a solution. The aqueous alcohol solution containing the gluten-derived protein is then admixed with an aqueous acid solution in an amount sufficient to cause the gluten-derived protein to precipitate in the form of microparticles, due to their insolubility in the water-rich mixture to form a stable colloidal dispersion. The order in which the aqueous alcohol solution of gluten-derived protein and the aqueous acid solution are admixed to each other, does not affect the final product. Further, these two aqueous solutions can be introduced to each other with minimal agitation or varying degrees of shear, such as by homogenization, without changing the properties of the resultant colloidal dispersion.

The resulting colloidal dispersion can then be treated, e.g., by evaporation or diafiltration, to reduce the amount of alcohol. The gluten-derived protein colloidal dispersion is substantially free of alcohol, that is, it contains none or only trace amounts of organic solvent. When the colloidal dispersion is applied to a substrate of choice and the water is evaporated, the particles fuse to form a continuous, transparent or translucent film. The continuity of films, produced according to this invention is superior to their ethanolic counterparts.

Alternatively, stable colloidal dispersions can be formed by preparing a solution comprising gluten-derived protein in an aqueous alcohol medium. A suitable acid can be added, followed by addition of water in an amount sufficient to lower the alcohol concentration to a level at which the gluten-derived protein remains soluble therein. The solubilized protein is then precipitated as microparticles by removing an amount of alcohol from the medium to a level at which the protein is no longer soluble therein.

The ratio of alcohol to water will depend upon the identity of the gluten-derived protein and solubility limits therefor and can be readily ascertained. See R. A. Reiners et al., *Corn Proteins: Potential for Their Industrial Use* 58th American AAOC Meeting, St. Louis, Mo. (Nov. 4, 1973).

In yet another embodiment, colloidal dispersions can be made by-dispersing wheat gluten in a dilute acid medium, under agitating conditions. The insoluble starch component is removed by, for example, centrifugation, to yield a colloidal dispersion comprising gliadin and glutelins. The resultant dispersion is stable and homogeneous under typical ambient storage conditions. When coated onto a substrate, a continuous, glossy film is formed by the fusion of protein microparticles at ambient temperatures (approximately 25° C.).

In any of the embodiments described above, a wide variety of acids can be used to stabilize microparticles within the colloidal dispersion. Suitable organic and inorganic acids should be soluble in the medium and are selected from classes which include but are not limited to amino acids, alpha hydroxy acids, phosphoric acid, mono- and tricarboxylic acids. In the case of monocarboxylic acids, any one can be used provided that it is soluble in water at greater than 0.5% by weight. Acids that form stable dispersions and which are useful within these classes include lactic acid, citric acid, malonic acid, phosphoric acid, fumaric acid, malic acid, glutaric acid, transaconitic acid, acetic acid, propionic acid, sorbic acid, cysteine and glycyl glycine. Lactic acid, citric acid, acetic acid or phosphoric acid are most preferred. See Table 1 in the Example Section which shows the effect of acid on colloid formation. These data show that there is no correlation between either pH or ionic strength and the ability to stabilize the colloidal dispersion. However, the preferred pH range is from about 1.4 to about 5.5. The presence of acid further acts as an antimicrobial and thus replaces the need for additional preservatives.

The concentration of gluten-derived protein particles in the colloidal dispersion is generally up to about 10% by weight, with from about 5 to about 10% by weight being preferred. Higher concentrations of gluten-derived protein can be achieved (e.g., up to about 40% by weight) if the ethanolic gluten-derived protein solution is added to an aqueous acidic solution (see Example 2). The gluten-derived particles have a medium volume diameter of about 10 microns or less, with about 1 micron being preferred. The colloidal dispersion may be further concentrated to up to about 20% by weight, by ultrafiltration, evaporation or other appropriate techniques, or reduced to a dry powder, using standard techniques such as flash drying, lyophilization or spray drying. For example, ultrafiltration using membranes having a cut-off of 300,000 NMWL (nominal molecular weight limit) or less is a preferred method of concentrating the colloidal dispersion and, at the same time, removing low molecular weight compounds dissolved in the aqueous medium. The concentrated dispersion can be diafiltered to reduce the amount of residual alcohol solvent to trace amounts. The diafiltration can be done continuously by staged addition of water or in a batch mode by constant volume batch diafiltration. Evaporation is the preferred method.

The concentrated dispersion can, optionally, be dried to a powder. This can be accomplished by lyophilization or evaporation, at a pressure of less than about 500 millitorr (mtorr) until the water and other volatiles have been evaporated (to about 1–10% moisture content), and a fine powder remains. Alternative forms of drying, such as flash drying, fluid-bed drying or spray drying can be used. The drying method will depend upon the protein or prolamine used. This powder can then be stored and handled without refrigeration or other special handling procedures. Rehydration can be accomplished by adding the powder to water, or an aqueous medium, with agitation sufficient to resuspend the protein particles and form a colloidal dispersion that is similar to the never dried colloidal dispersion and resultant film therefrom. The ratio of powder to water will depend upon the concentration of the final reconstituted product which is desired.

In one embodiment, waxes can be added to the colloidal dispersions of this invention in the form of a wax latex or emulsion. Methods for making wax latices or emulsions are described in detail in U.S. Pat. No. 5,482,722, the teachings of which are incorporated herein in their entirety. The wax latex or emulsion can be combined into the colloidal dispersion, under agitating conditions (e.g., high shear), until a homogeneous suspension is reached.

The properties of the dispersion can be modified for a given application. Such modifications can produce a coating having enhanced barrier properties or mechanical stability. The desired mechanical properties will depend upon the substrate to be coated but in any event should withstand the normal stresses encountered during the coating process, the subsequent shipping and handling of the food, and should maintain the food's integrity and barrier properties over storage. One method of modifying is to incorporate additives into the colloidal dispersions.

Examples of suitable additives include waxes (e.g., rice bran wax, candelilla wax, beeswax, paraffin wax, Japan wax, ceresin wax, carnauba, microcrystalline wax, sugarcane wax and petroleum wax), oils and/or surfactants, e.g., acetylated glycerides, or diacetyl tartaric acid esters of mono- and di-glycerides (DATEM esters)) can be incorporated to improve the water resistance; and glycerol, propylene glycol or polyethylene glycols can be used to plasticize the film. Composite film structures with complex properties can be formed by using other polymeric or film-forming additives, such as other proteins which are soluble at low pH, hydrocolloids or synthetic polymers (e.g., polyethylene glycol). Examples of suitable hydrocolloids includes, but are not limited to, dextrin, xanthan gum, guar gum, locust bean gum and microcrystalline cellulose. Flavors, colors, antioxidants and/or preservatives can also add useful function to the films. Additives which are soluble in water can be incorporated in the coating formulation by direct dissolution in the aqueous medium of the colloidal dispersion. Additives which are insoluble in water may be dispersed by surfactants and added as an emulsion or colloidal dispersion. Examples of insoluble additives include but are not limited to flavors, trace minerals, vitamins, nutrients or nutraceuticals (e.g., vitamin A, vitamin E).

Water insoluble additives as described above can be incorporated in the microparticles by dissolving or dispersing the additive in the alcoholic gluten-derived protein solution prior to the precipitation process in which the colloidal dispersion is formed. The additive, when incorporated in the gluten-derived protein microspheres, can be either evenly distributed throughout the sphere, in the center of the sphere or on the surface of the sphere, depending on the chemical nature of the additive. Alternatively, the additive may form microspheres or droplets separate from the protein microspheres.

The properties of the product can be influenced by chemical modification of the proteins. Such modifications can include, for example, treating the proteins with an acid, base or other agent which alters the structure of one or more of the amino acid side chains, which, in turn, alters the character of the protein. For example, the high glutamine and asparagine content of prolamines, particularly zein, provides a means for manipulating the charge characteristics of the protein by deamidation, thereby providing a wide range of hydrophobicity. The preferred deamidation method involves mild acid-catalyzed deamidation (at a pH of about 1) at elevated temperatures (e.g., from about 25° C. to about 65° C.) for a period of time sufficient to accomplish the desired level of deamidation. The deamidation process may be followed by measuring the release of ammonia with an ammonia electrode. Deamidation is controllable, and may be terminated by the addition of ammonium carbonate or other base. Other examples of chemical modification include esterification of the protein with fatty alcohols, or acylation of the protein with fatty anhydrides.

The present gluten-derived protein based colloidal dispersions can be used in various applications in the food and pharmaceutical industries, including as edible coatings or barriers in foods or drugs. Suitable substrates include but are not limited to confections, raw, cooked and dehydrated meats, dessert items, snack foods, candies (e.g., chocolates), fruit (e.g., raisins), vegetables, baked goods, cereals, seeds, nuts (e.g., peanuts, cashews, almonds, macademia), beans (e.g., coffee beans), vitamins and tablets.

For food and drug purposes, the coating should impart neither significant flavor nor color, so that it does not substantially alter the flavor or appearance of the food or the drug product. Some commercial preparations of gluten-derived proteins may impart a yellow color to the protein suspension or may have an objectionable odor and/or flavor. To eliminate this problem, the proteins may be decolorized and/or deflavored. Decolorizing can be done prior to making the suspension. Decolorizing can be accomplished by known techniques for removing selected substances, such as extraction with organic solvents (e.g., acetone, hexane, absolute alcohol or methanol). Decolorizing can also be effected by passing the protein feed solution through a column, or other appropriate container, packed with an adsorbent, such as activated charcoal or a polymeric resin. For this purpose, non-polar, neutral, macroporous polymeric beads having a high surface area (e.g., from about 100 to about 1000 square meters per gram) can be used. Macroporous polystyrene or styrene-divinylbenzene copolymer beads having a pore size from about 10 to about 200 angstroms, are preferred. In one embodiment, the gluten-derived protein is dissolved in alcohol at a concentration of about 2 to about 40% and run through a column containing polystyrene beads at a space velocity of 2 1/hr per gram of beads. This procedure removes the color from the protein and passes the protein with a recovery of over 95%.

Deflavoring the protein removes the "grassy" or "grainy" flavor and/or odor which maybe present in some proteins. One deflavoring method is to extract the dried protein with solvents such as alcohols, acetone, hexane or mixtures thereof. The solvent can then be removed from the gluten-derived protein by filtration and drying. Deflavoring can also be accomplished by ultrafiltration. For this purpose, membranes having a pore size less than about 1,000 NMWL can be used. In one embodiment, the protein suspension is deflavored by filtering the suspension through a 1,000 NMWL hollow fiber filter cartridge. Protein microparticles treated with ultrafiltration exhibited reduced odor and flavor.

The edible coating or barrier can be applied to the substrate of choice by any suitable method. Examples of suitable methods include spraying, dipping, pouring, brushing, rolling, extrusion, coprecipitation, or by a composite, whose rheology and composition allows it to be extruded as a film. To suit the particular method selected, it may be necessary to adjust the viscosity of the dispersion by temperature control or the addition or deletion of the plasticizer. For example, it is generally necessary to add plasticizer to the dispersion to reduce viscosity if spraying is to be-used. The gluten-derived protein colloidal dispersion is applied to the substrate and dried at ambient temperature to evaporate the water and cause the microparticles to fuse or coalesce into a continuous film.

The present method using a water-based gluten-derived protein colloidal dispersion has several advantages. The colloidal dispersion can be dried to form a stable dry product which can be readily reconstituted with water, or other aqueous medium, prior to use. The gluten-derived protein colloidal dispersion is stable and homogeneous under storage, and due to the presence of the dilute acid inhibits microbial contamination in the absence of antimicrobial agents. The colloidal dispersion forms a continuous, durable film upon curing which is colorless, odorless, bland to the taste, non-toxic and provides gloss. The film can be applied to foods to form an edible barrier to moisture, lipid, gases and/or other additives, such as colors, flavors, antioxidants and/or preservatives. The edible coating is particularly useful in prepared foods which are stored for a period of time prior to use and are susceptible to the corrosive and deteriorative effects of gases and humidity changes. Likewise, the present gluten-derived protein coating can be used in other food systems (e.g., heterogeneous) where it is desirable to prevent migration of components such as keeping moisture from escaping or migrating within the systems, or preventing colors and/or flavors from blending. In drug applications, a gluten-derived protein coating can be applied to tablets for oral ingestion and enteric coatings, for example, to provide a barrier between the drug and air or moisture.

Film properties of the gluten-derived protein coating can be modified by controlling the concentration of gluten-derived protein in the colloidal dispersion, the mode of application and the number of layers applied. For example, where a thicker coating is desired, either a colloidal dispersion having a higher gluten-derived protein concentration or multiple layers can be applied. If multiple layers are applied to the substrate it is important to insure that the final coating is continuous to provide adequate barrier and mechanical properties.

The film formed from the present gluten-derived protein colloidal dispersion is superior to solvent-cast gluten-derived protein films. Films cast from the dispersions of this invention were more dense, homogeneous and provided higher gloss than their ethanolic counterparts.

The invention is further illustrated by the following examples:

EXAMPLES

Materials

Zein was prepared according to U.S. Pat. No. 5,254,673. Vital Wheat Gluten was obtained from Manildra Milling Corp (Shawnee Mission, Kans.) Beeswax, Candelilla and Rice Bran waxes were obtained from Frank B. Ross Co., Inc. (Jersey City, N.J.). ALDO™, glyceryl monolaurate from Lonza (Fairlawn, N.J.), cocoa butter (Cacao Industrias, S.A; Peru), CRISCO™ produced by Proctor & Gamble, Durkex 100 oil (Van den Bergh Foods, Inc., Rockville Center, N.Y.), lactic acid, citric acid, malic acid, glutaric acid, fumaric acid, acetic acid, phosphoric acid, transaconitic acid, glycyl glycine, pectic acid, cysteine, triethanolamine and ammonium chloride were obtained from Aldrich Chemical Co. (Milwaukee, Wis.). Freeman Zein 4000 was obtained from Freeman Industries, Inc. (Tuckahoe, N.Y.). Crude barley protein was obtained from Alko. All percentages in the examples are by weight unless otherwise specified.

Product Characterization

A. Film Properties:

1. Physical:

ASTM methods were used for measuring drying time (ASTM D1640), gloss (Byk Gardner MicroTri-Gloss glossimeter) (ASTM D523-85), cross-hatch film adhesion (ASTM D-823), Gardner Mandrel flexibility (ASTM D-823), and hardness (ASTM D3363-74).

The particle size and shape distribution for the protein, wax and/or lipid microparticles were determined using a Microtrac Particle Size Analyzer (Leeds & Northrop Instruments, North Wales, Pa.) or a light microscope (Olympus, BH-2) equipped with a BioScan Optimas Image Analyzer.

Film ultrastructure: the zein, wax and wheat protein films were dried on microscope cover slips at 25° C. and visualized in cross section using standard Scanning Electron Microscopy (SEM) techniques (1,000× and 5,000×). In all cases, the films were much more dense and homogeneous than their ethanolic counterparts. The latter contained many void spaces and artifacts which occur during drying. The zein films dried from ethanol had large void spaces, often having diameters of 3 to 5μ. By contrast, the dried films prepared using aqueous-zein colloidal dispersions of this invention typically have no voids or porosity which can be discerned by SEM even at 5000x. The aqueous, colloidal dispersion of zein, dried with the same solids content produced films which are more compact (approx. 6μ) vs 10μ for their ethanolic counterparts. It should be noted, however, that the surfaces of each type of film were comparably smooth. Films cast from aqueous, gliadin colloidal dispersion, dried as above and examined by SEM (1000× and 6,250×) were more dense and homogenous than their ethanolic counterparts, which had void spaces and vacuoles which could be approximately 3μ and up to 10μ in diameter (equal to the film thickness). In contrast, the wax colloidal dispersion, prepared as described in Example 12, dried under ambient temperature conditions, fused only partially. As a result, porosity was noted both in the dried film surface and cross-section (evident at 100×, but readily measured at 2,500× and 6,250× to be 3 to 7μ or approximately one half the film thickness, but typically less). The porosity resulted from incomplete particle fusion and can be adjusted by heating and increasing the low melting point (<25° C.) lipid/wax ratio. The mixed wheat glutenin and gliadin dispersion produced a dry film (approx. 8μ) which was less prone to cracking than gliadin alone and had a smooth surface. In addition, small pores (approx. 0.1 to 0.5μ) were seen if the dispersion was not fully degassed.

2. Sensory:

Films were prepared from each coating by drying a suspension containing 0.5 grams of total solids in a plastic weighing dish at room temperature. Each film was chewed by a member of the sensory panel and off-flavor and residual acid were evaluated and compared to calibrated references. The films were scored on a scale of 1 to 10, where 10 represented strong off-flavors and residual acid; and 1 represented minimal off-flavor and residual acid. The reference materials were scored as 6 and 10 for 0.125% acetic and 0.125% lactic acid solutions, respectively.

EXAMPLE 1

Formation of Acidic Zein Colloidal Dispersion

A zein solution (10% solids) in 80% ethanol: 20% water (v/v) was slowly added to an equal volume of dilute acid (2% citric acid) without any agitation. No coagulation occurred, as would be expected from lowering the ethanol titer below the minimum solubility of zein (55% titer). Instead, an ethanolic zein layer formed on top of the aqueous acidic layer. At the interface, a thin, white layer began to form. When stirred gently, this layer dispersed into the lower aqueous phase, transforming it from clear to translucent and, ultimately, opaque. As gentle stirring proceeded, the supernatant ethanolic layer diminished and, in minutes, vanished as the milky opacity in the aqueous phase reached a maximum opacity.

EXAMPLE 2

Formation of Acidic Zein Colloidal Dispersion and Film Therefrom

A 2% citric acid solution (100 ml) was added to an equal volume of zein solution (10% solids) in 80% ethanol using a magnetic stirring bar agitated at medium speed. As the acidic aqueous solution made contact with the ethanolic zein solution, a localized cloudiness formed which was immediately dissipated by stirring until the titer reached approximately 55%, at which point the colloidal dispersion of the zein remained as a stable suspension. The addition rate was 25 ml/min. The residual ethanol was then removed on the rotor evaporator (29 inches Hg and 45° C.) to yield a stable zein suspension having a particle size of $0.2\mu$ (mean volume; mv). No subsequent settling of particles or shift to a larger mean particle size was noted after 2 months at room temperature. Also, without any added antimicrobial agents, no microbial growth was noted after prolonged storage at room temperature.

When several milliliters of this zein colloidal dispersion were placed on a standard coating board and spread to a 3 mil thickness with a Bird film applicator, the resultant fluid film dried to a clear, glossy layer (see Table I).

EXAMPLE 3

Colloidal Dispersion Formation During Ethanol Evaporation

Method 1:

Two hundred grams Vital wheat gluten were dispersed in 1600 ml of 80% ethanol (12.5% w/v), heated 30 min (40° C.), centrifuged (5000 rpm; 10 min.) and gravity filtered (Fisher P4 filter paper; medium fine porosity) to yield 1000 ml of gliadin extract (8.4% solids, w/v). Ten grams of lactic acid were then added with stirring followed by the gradual addition of 300 ml of distilled water. Before placing the solution on a rotary evaporator, a drop or two of a suitable antifoam, such as decanol was added. The ethanol was then evaporated which resulted in formation of a colloidal gliadin dispersion in aqueous ethanol. When the solubility of gliadin was exceeded no agglomeration was observed. The resultant product had a gliadin concentration of 19.4% and a volume of 400 ml due to azeotropic distillation of water. When diluted to 10% solids with water, this preparation became whiter but formed films which were equivalent in performance and properties to those prepared according to Example 2. The higher solids concentration made it possible to coat substrates in one coat which previously would have required two or more coats. This process was much more efficient than methods which could not achieve higher concentrations without distillation of substantial amounts of water after formation of the colloidal dispersion. The latter process is inefficient from an energy standpoint and also tends to thermally destabilize the colloidal dispersion.

Method 2:

To a stirred 10% solution of zein (80% ethanol; 200 ml) was added 2 grams lactic acid, followed by the gradual addition of 100 ml distilled water. Two drops of decanol were then added as an antifoam and the resultant, minimum titer solution (53%) of zein was then placed on a rotary evaporator and the ethanol evaporated. When the solubility of zein was exceeded, a white, colloidal suspension formed which was stable despite its high, final concentration (20% w/v).

EXAMPLE 4

Formation of a Gliadin-Based Colloidal Dispersion and Film Therefrom

Fifteen grams vital wheat gluten powder were dispersed in 100 ml of 73% ethanol and heated to 40° C., with magnetic stirbar mixing for 30 minutes. The resulting mixture was centrifuged (1000 rpm, 5 min.) and the residue discarded. The supernatant was cloudy and microscopic examination using polarized light revealed crystalline, starch particles. These starch particles were removed by gravimetric filtration through a fine porosity filter paper (Fisher P4, medium fine porosity). The filtrate (80 ml; 5.5% solids) had the equivalent of a 29% yield of gliadin. The filtrate was concentrated by vacuum distillation of ethanol and azeotroped water until the solids were 8%. This required addition of a small amount of absolute ethanol to maintain gliadin solubility. The gliadin colloidal dispersion was formed by addition of the 8% gliadin solution into an equal volume of stirred lactic acid (2%, 25° C.). A stable and translucent colloidal dispersion was formed immediately and remained free of microbial growth for months at ambient storage conditions.

The colloidal dispersion was cast as a thin film on a coating board as described in Example 2. The resultant film was clear and glossy. A similar film was cast on a bagel or baked surface and produced a high gloss finish. On a chocolate bar, high sugar confection, or apple, it also produced a high shine. When the colloidal dispersion was dried in a nonstick muffin pan (2 ml at 25° C.), the resultant film contained microcracks and was extremely brittle. Addition of high molecular weight plasticizers to the colloidal dispersion, like polyethylene glycol (PEG) 3000 (10% based on protein solids), reduced or eliminated this defect caused by drying the colloidal dispersion to a film.

Filter papers (53 mm diameter) were coated (62 mg) with either colloidal dispersions of zein or gliadin, dried (50° C. to constant weight) and then placed over a tarred water vessel containing a known weight of water. The observed weight loss after 65 hours was used as an index of relative water barrier properties. Films cast from the zein colloidal dispersion had a weight loss of 42 mg/hr. Films cast from gliadin colloidal dispersions had a weight loss of 58 mg/hr.

EXAMPLE 5

Relative Colloidal Dispersion Formation Efficacy of Different Acids on Colloidal Dispersion Formation A representative sampling of organic and inorganic acids in water as listed in Table I were prepared according to Example 1 to determine their relative efficacy as gluten-derived protein colloidal dispersion stabilizers. Lactic acid, citric acid, malonic acid, malic acid, glutaric acid, transaconitic acid, phosphoric acid, cysteine, ascorbic acid, fumaric acid, benzoic acid, acetic acid, propionic acid, sorbic acid and close analogs were tested. This heterogeneous set of acids spans several different categories: amino acids, alpha hydroxy acids, tricarboxylic acids and low molecular weight monocarboxylic acids. From the data shown below, there is no apparent correlation with the stability of the colloidal dispersions between either pH or ionic strength, as measured by conductivity.

TABLE I

| Acid | % (w/v) | pH | Conductivity (μmhos) | Effect on Zein Colloid Formation |
|---|---|---|---|---|
| Acetic acid | 2 | 2.7 | 1,070 | S |
| $H_3PO_4$ | 2 | 1.6 | >20,000 | S |
| $H_3PO_4$ | 1 | 1.7 | 10,500 | S |
| $H_3PO_4$ | 0.5 | 1.8 | 710 | S |
| HCl | 2 | 0.8 | >20,000 | ppt |
| HCl | 1 | 1.1 | >2,0000 | ppt |
| HCl | 0.5 | 1.3 | 15,500 | ppt |
| $NH_4Cl$ | 2 | 4.6 | >20,000 | ppt |
| $NH_4Cl$ | 1 | 4.8 | >20,000 | ppt |
| $NH_4Cl$ | 0.5 | 5.0 | 14,400 | ppt |
| $H_2SO_4$ | 2 | 0.9 | >20,000 | ppt |
| $H_2SO_4$ | 1 | 1.4 | >20,000 | ppt |
| $H_2SO_4$ | 0.5 | 1.4 | >20,000 | ppt |
| Lactic acid | 2 | 2.0 | 2500 | S |
| Lactic acid | 1 | 4.5 | 1740 | S |
| Lactic acid | 4.2 | 2.1 | 13500 | S |
| Transaconitic | 2 | 2.2 | 13500 | S |
| Glycyl glycine | 2 | 5.2 | 400 | S |
| Pectic acid | 2 | 2.8 | 1090 | ppt |
| Cysteine | 2 | 5.2 | 400 | S |
| Triethanolamine.HCl | 2 | 4.5 | 15,000 | ms |
| Citric | 2 | 2.2 | 2200 | S |
| Citric | 1 | 2.4 | 1900 | S |
| Fumaric | 1.5 | 1.9 | 3300 | ms/ppt |
| Benzoic | 1 | 2.2 | 6400 | ppt |
| Malonic | 1 | 2.1 | 5100 | ms/ppt |
| Malic | 1 | 2.5 | 2200 | ms/ppt |
| Glutaric | 1 | 2.8 | 880 | ms/ppt | ppt = precipitate
S = stable
ms = metastable

EXAMPLE 6

Zein/Cocoa Butter Composite Film

Ten grams cocoa butter were comelted with glyceryl monolaurate and dispersed in hot water (80° C., 100 ml) and then homogenized (10,000 rpm) for 2 minutes. The emulsion was placed on an ice bath and the homogenization was continued until the water temperature was about 10° C. which insured that the liquid phase had solidified.

The resultant cocoa butter latex was then combined with a zein colloidal dispersion made in 2% citric acid (as described in Example 1 or 2), with no coagulation. The suspension was readily mixed and concentrated by centrifugation to yield a uniformly mixed zein/cocoa butter composite. When the freshly mixed suspension was simply air dried (without centrifugation) an opaque, cocoa butter-flavored film resulted.

Various GRAS waxes (rice bran, Candelilla and beeswax) were also formed into latices alone or in combinations as described in U.S. patent application Ser. No. 08/311,930 and incorporated herein by reference in its entirety. These preparations were all intermiscible with each other and with the above acidified colloidal dispersions. Films dried from them were expected to exhibit enhanced water barrier properties. Their sensory properties were better, in that it was easy to bite cleanly through the films due to their enhanced plasticity.

EXAMPLE 7

Antimicrobial Functionality of Coatings Cast from Acidic Colloidal Dispersions

Gliadin colloidal dispersions were prepared in acetic, lactic, erythorbic, sorbic, ascorbic and citric acids according to the method of Example 2. Baked goods coated with these colloidal dispersions showed increased resistance to mold at ambient temperature and had better gloss, compared to both uncoated controls and counterparts coated with neutral pH caseinate-based or soy-based coatings. The amount and type of acid used allows blends to be made which meet both antimicrobial and sensory objectives depending upon the desired end use and product to be coated. Example 8

Lactic Acid Stabilized Wheat Gluten and Film Therefrom

To a 4% lactic acid solution (100 ml) was added vital wheat gluten (4.4 grams) with vortex stirring (30 min). The evenly dispersed suspension was then homogenized (12,000 rpm, 3 min.) despite some foaming. The dispersion had a low viscosity and was sprayable. Unlike a typical dough preparation minimal swelling of the proteins had occurred.

When cast on a black coating board, the suspension dried to a white, partially fused, opaque film. When the dispersion was placed on a heated hamburger bun it dried to a matte finish and had no gloss.

A wide variety of plasticizers were added to the preparation in order to produce a clear or glossy coating. These plasticizers include the following substances: ethanol (10–50%), additional lactic acid (4%), polyethylene glycol (PEG) (1%; molecular weight 3,400), 2-propylene glycol (1%), arabinogalactan (2%), urea (2%), soy protein (2%) and sorbitol (2%). Only 2-propylene glycol and arabinogalactan resulted in any improvement in the gloss. Even together these still did not give a high gloss finish on baked goods or other surfaces.

The homogenized and acidified wheat gluten suspension was then centrifuged (500 rpm; 10 min.) resulting in a small amount of white starch sediment. Centrifugation was repeated (1000 rpm; 10 min.) and a larger white centrifuge cake was isolated. The supernatant suspension was still opaque but produced a high gloss shine on baked goods, chocolate, apples and confections. When a thin film of this translucent colloidal dispersion was cast on a black coating board as described in Example 2, it yielded a translucent, cloudy film.

EXAMPLE 9

Scaled-up Process for Making Lactic Acid Stabilized Wheat Gluten and Film Therefrom To 400 ml of distilled water was added 16 grams lactic acid to form a dilute acid solution. Vital wheat gluten (62.4 grams; approximately 15% w/v) was then dispersed into the dilute acid solution with vortex mixing. A few drops of dodecanol was added as an antifoam and the suspension was homogenized (10–15,000 rpm) for 5 minutes. The suspension was transformed from a dull gray to a off-white appearance. To fully deaerate the suspension it was then stirred briefly (10 min.) with a stirbar. The suspension was filtered through cheesecloth and the filtrate centrifuged for 10 minutes at 2000 rpm. The supernatant was decanted and the white starch cake was discarded (any brown/tan sediment contains wheat protein(s) and can be resuspended by gentle shaking). The average particle size of this preparation was about 4 to 6 microns.

When this gliadin and glutenin-rich suspension was cast on a bagel, chocolate bar, apple, high sugar confection, zucchini squash, coffee bean or analogous substrate, it produced a high gloss coating which was strong and non-tacky at room temperature. When a 15% suspension (2 ml) was dried at 25° C. in a nonstick muffin pan, a strong, semi-flexible film resulted which exhibited no evidence of microcracks, unlike the gliadin colloidal dispersion described in Example 4.

Filter papers (53 mm) coated (92 mg) with either purified zein prepared according to U.S. Pat. No. 5,254,673 or with the purified wheat protein suspension prepared as described above, were used to seal tared containers of water. The relative water barrier properties of each coated filter paper was compared with an uncoated filter paper control over 23 hours. The control exhibited a weight loss of 108 mg/hr; the zein coating exhibited a weight loss of 20 mg/hr; and the wheat protein glaze exhibited a weight loss of 27 mg/hr.

EXAMPLE 10

Minimizing Acid Taste in Films Cast from Aqueous Colloidal Dispersions

Zein, gliadin, or wheat protein colloidal dispersions (10% solids) were formed using lactic acid concentrations of 0.5% using the methods described in Examples 2 and 8. This resulted in a major reduction in residual acidity in the dried films. At a 1% lactic acid level, the wheat protein colloidal dispersion had a pH of 3.4 but did not have a significant acid flavor when dried. Film cast from the zein dispersion still exhibited a significant acid flavor at the 1% lactic acid level.

The use of a more volatile acid, like acetic acid, minimized residual acidity in the dried film at all acid concentrations tested (0.5 to 4%). The amount of residual acidity observed depended on both the drying temperature and curing time.

EXAMPLE 11

Barley Gluten Glaze

Using the methods described in Examples 8 and 9, a crude barely protein was dispersed in 4% lactic acid, homogenized (12,000 rpm) and centrifuged (1,200 rpm) to obtain a supernatant colloidal suspension which could form a glaze. As described in Example 8, the gloss of the glaze was improved by removal of the starch fraction. The glaze was applied to hamburger buns, bagels, and a standard coating board. As with some other baking glazes, this glaze was cloudy on the standard Leneta Coating Board.

EXAMPLE 12

Formation of a Stable Wax Latex

Rice bran wax (32 grams), CRISCO® (12 grams), and glyceryl monolaurate (GML; 11 grams) were comelted at 90° C. and added to 375 ml of distilled water which had been heated to boiling. The melted lipids were poured into the water phase and stirred with a spatula until they dispersed as a yellowish cream. The solution was then reheated to boiling in the microwave and restirred. The crude emulsion was then homogenized using a POLYTRON® homgenizer (10,000 rpm; 4 min) resulting in a white emulsion. While still homogenizing, the emulsion was cooled in an ice bath until the temperature was below 20° C. At this point, the emulsion was converted into a stable latex whose particles will not coalesce. The resultant wax/lipid latex creams on standing for days but can be readily resuspended as a uniform colloidal dispersion by gentle swirling or shaking.

Reduction of the wax ratio and use of lower melting point lipids produces wax latices which were more prone to fuse at ambient temperature. The following formulations and the above procedure produces a latex that fuses at ambient temperature: beeswax (4.5 grams; 15%), Durkex 100 oil (13 grams; 46%), coconut oil (2.4 grams; 8%), NEOBEE™ M-5, a medium chain triglyceride (9 grams; 30%) and glyceryl monolaurate (GML) (0.3 grams; 1%).

EXAMPLE 13

Composite Protein-Lipid Films

To an 8×18 cm (i.d.), non-stick bread pan, was added 50 ml of a 50:50 mixture of aqueous, zein colloidal dispersion (10% solids), and the aqueous wax/lipid latex (approx. 14% w/v), prepared as contrived in Example 8 containing CRISCO®. After drying at ambient temperature overnight, the resultant film was found to have a pie crust texture and was readily chewable. By contrast, 100% zein films, dried from the same 10% colloidal dispersion of zein, were tough and extremely difficult to bite.

The fact that the wax latices can be readily mixed with the colloidal dispersions of zein, gliadin, and glutenin/gliadin without precipitation of any components makes uniform distribution of these otherwise immiscible materials easy. As a result, the textural properties of the films can be easily modified by blending stock suspensions of the various colloidal dispersions described in the previous examples.

EXAMPLE 14

Comparison of Film Performance Produced from Various Colloidal Dispersions and Commerical Glazes Colloidal dispersions made according to this application and commercially available glazes were studied for gloss at 20° C., the dry through time (measured in seconds) and the ratio of volatile organic chemicals (V.O.C.) (i.e., any organic substance that has a boiling point at or below the boiling point of water). Table II summarizes the results. The results show that while the ethanolic protein solutions have faster dry through times, the residual organics in the film were significantly high compared to the colloidal dispersions made according to this invention. The results further show that water-based dispersions provide better gloss than their ethanolic counterparts or water soluble proteins.

TABLE II

| Sample | Gloss (@ 20°) | Dry thru time (seconds) | V.O.C./solids ratio |
|---|---|---|---|
| Freeman Zein Commercially avail. 4000; 80% EtOH | 37 | 35* | 80:10 |
| OptaZein; 80% EtOH | 40 | 47* | 80:10 |
| OptaZein Colloidal Dispersion; 95+% H$_2$O (Ex. 2) | 45 | 150 | 5:10 |

TABLE II-continued

| Sample | Gloss (@ 20°) | Dry thru time (seconds) | V.O.C./solids ratio |
|---|---|---|---|
| Gliadin Colloidal Dispersion 95+% H$_2$O (Ex. 4) | 54 | 285 | 5:10 |
| Gliadin Colloidal Dispersion + PEG 400 (10%) (Ex. 4) | 62 | 285 | 4:11 |
| Golden Glo ™ Caseinate/H$_2$O Baker's Glaze Commercially avail. (premade glaze) | 41 | 285 | 0:10 |

*dried at 50° C.; all other samples were dried at 25° C.

Equivalents

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A method for making an aqueous, colloidal dispersion of gluten microparticles, comprising the steps of:
    a. preparing a dilute aqueous acid dispersion of gluten under agitating conditions to yield a stable colloidal dispersion of gluten microparticles, wherein the dispersion is stable and homogeneous under storage conditions; and
    b. removing insoluble starch present in the gluten from the aqueous acid dispersion.

2. The method of claim 1 wherein the gluten is from wheat, barley, rye, rice or sorghum.

3. The method of claim 1 wherein step (b) is performed by centrifugation.

4. The method of claim 1 further comprising adding a wax latex or emulsion to the colloidal dispersion.

5. The method of claim 1 further comprising incorporating an additive into the colloidal dispersion which is selected from the group consisting of plasticizers, coloring agents, flavoring agents, trace minerals, vitamins, nutrients, nutraceuticals and combinations thereof.

6. The method of claim 1 further comprising drying the colloidal dispersion to form a powder.

7. An aqueous colloidal dispersion produced by the method of claim 1.

8. An edible film which was cast from an aqueous colloidal dispersion produced by the method of claim 1.

9. A method for making an edible coating on a substrate using a colloidal dispersion consisting essentially of gluten microparticles which are suspended in a dilute aqueous acid solution, comprising the steps of:
    a) applying an aqueous colloidal dispersion of gluten microparticles produced according to the method of claim 21 to a substrate; and
    b) drying the colloidal dispersion under ambient or elevated temperature conditions to fuse and form an edible continuous coating of gluten microparticles onto the surface of said substrate.

10. The method of claim 9 wherein the substrate is selected from the group consisting of chocolates, high sugar confections, fruits, meats, baked goods, vegetables, seeds, nuts, beans, cereals, vitamins and tablets.

11. A substrate having an edible coating thereon, said coating comprising fused microparticles of gluten from an aqueous colloidal dispersion obtained by the method of claim 1, in which the liquid phase was removed at ambient or elevated temperature.

12. The coated substrate of claim 11 wherein the substrate is selected from the group consisting of chocolates, high sugar confections, fruits, meats, baked goods, vegetables, seeds, nuts, beans, cereal, vitamins and tablets.

13. A powder produced by drying a stable, homogenous, dilute aqueous acid colloidal dispersion of gluten microparticles obtained by the method of claim 1.

* * * * *

UNITED STATES PATENT AND TRADEMARK OFFICE
CERTIFICATE OF CORRECTION

PATENT NO. : 5,736,178
DATED : April 7, 1998
INVENTOR(S) : Richard B. Cook and Mark L. Shulman It is certified that error appears in the above-identified patent and that said Letters Patent is hereby corrected as shown below:

In Claim 9, step (a) delete "claim 21" and insert ---claim 1---.

Signed and Sealed this

Fifth Day of December, 2000

Attest:

Q. TODD DICKINSON

Attesting Officer

Director of Patents and Trademarks